US012285137B2

(12) United States Patent
Mcconnell et al.

(10) Patent No.: US 12,285,137 B2
(45) Date of Patent: Apr. 29, 2025

(54) METHOD AND APPARATUS FOR ASSEMBLING ACCESSORIES IN A CADDY

(71) Applicant: WHIRLPOOL CORPORATION, Benton Harbor, MI (US)

(72) Inventors: John W. Mcconnell, St. Joseph, MI (US); Brandon T. Mock, St. Joseph, MI (US); John J. Myers, Saugatuck, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 71 days.

(21) Appl. No.: 18/128,294

(22) Filed: Mar. 30, 2023

(65) Prior Publication Data

US 2024/0324819 A1 Oct. 3, 2024

(51) Int. Cl.
*A47J 43/07* (2006.01)

(52) U.S. Cl.
CPC .... *A47J 43/0711* (2013.01); *A47J 2043/0738* (2013.01)

(58) Field of Classification Search
CPC ....... A47G 19/00; A47J 43/07; A47J 43/0711; A47J 2043/0738; B65D 81/32
USPC .................................................. 366/197–207
See application file for complete search history.

(56) References Cited

U.S. PATENT DOCUMENTS

| 6,068,397 | A | * | 5/2000 | Wilday | A47J 43/044 366/199 |
| 6,148,995 | A | * | 11/2000 | De Laforcade | B65D 81/3222 215/DIG. 8 |
| 11,213,170 | B2 | * | 1/2022 | Widanagamage Don | A47J 43/06 |
| 2005/0172824 | A1 | | 8/2005 | Estep | |
| 2005/0211707 | A1 | * | 9/2005 | Mak | A47J 47/18 220/23.86 |
| 2007/0108087 | A1 | | 5/2007 | Leung | |
| 2007/0295723 | A1 | * | 12/2007 | Mak | G01F 19/00 220/23.86 |
| 2013/0062448 | A1 | | 3/2013 | Krüger et al. | |
| 2023/0240476 | A1 | * | 8/2023 | Mock | A47J 43/0727 206/499 |
| 2023/0329483 | A1 | * | 10/2023 | Fox | A47J 43/0705 |
| 2024/0041260 | A1 | * | 2/2024 | Pierce | A47J 43/044 |

FOREIGN PATENT DOCUMENTS

WO 2020098702 A1 5/2020

* cited by examiner

*Primary Examiner* — Bryon P Gehman
(74) *Attorney, Agent, or Firm* — McGarry Bair PC

(57) ABSTRACT

A method and apparatus for assembling a set of stand mixer accessories with a caddy, including receiving a beater attachment in a first depression of a caddy base, receiving a whisk attachment in a second depression of the caddy base, and receiving a dough hook attachment in a in an arm of the caddy base.

20 Claims, 7 Drawing Sheets

METHOD AND APPARATUS FOR ASSEMBLING ACCESSORIES IN A CADDY

BACKGROUND

Mixers, including stand mixers, are appliances that include a motor for moving attachments or accessories to perform an action or cycle of operation on a load to-be mixed. Attachments or accessories can be interchangeable with the motor, such that multiple attachments or accessories can be utilized to perform attachment-specific or accessory-specific actions or cycles of operations on the load.

BRIEF SUMMARY

In one aspect, the present disclosure relates to a caddy for a stand mixer bowl, including a base shaped to be coaxially received at a concave surface of the stand mixer bowl, and defining a vertical axis, the base further including a first depression defining an axis offset relative to the vertical axis and adapted to receive a beater stand mixer attachment, a second depression adapted to receive a whisk stand mixer attachment, and an arm extending vertically away from the base and adapted to receive a dough hook stand mixer attachment, and a handle extending from the base.

In another aspect, the present disclosure relates to a method of assembling a set of stand mixer accessories with a caddy, the method including receiving a beater attachment in a first depression of a caddy base, receiving a whisk attachment in a substantially horizontal position, in a second depression of the caddy base, and after receiving the whisk attachment, receiving a dough hook attachment in a substantially horizontal position, in an arm extending vertically away from the caddy base, wherein the arm includes a first wall extending vertically away from the base and a second wall extending parallel with the first wall, and wherein the first wall and the second wall are spaced from each other such that the arm defines a U-shaped channel, such that the U-shaped channel receives a flange of the dough hook attachment.

DETAILED DESCRIPTION

Figure 1:
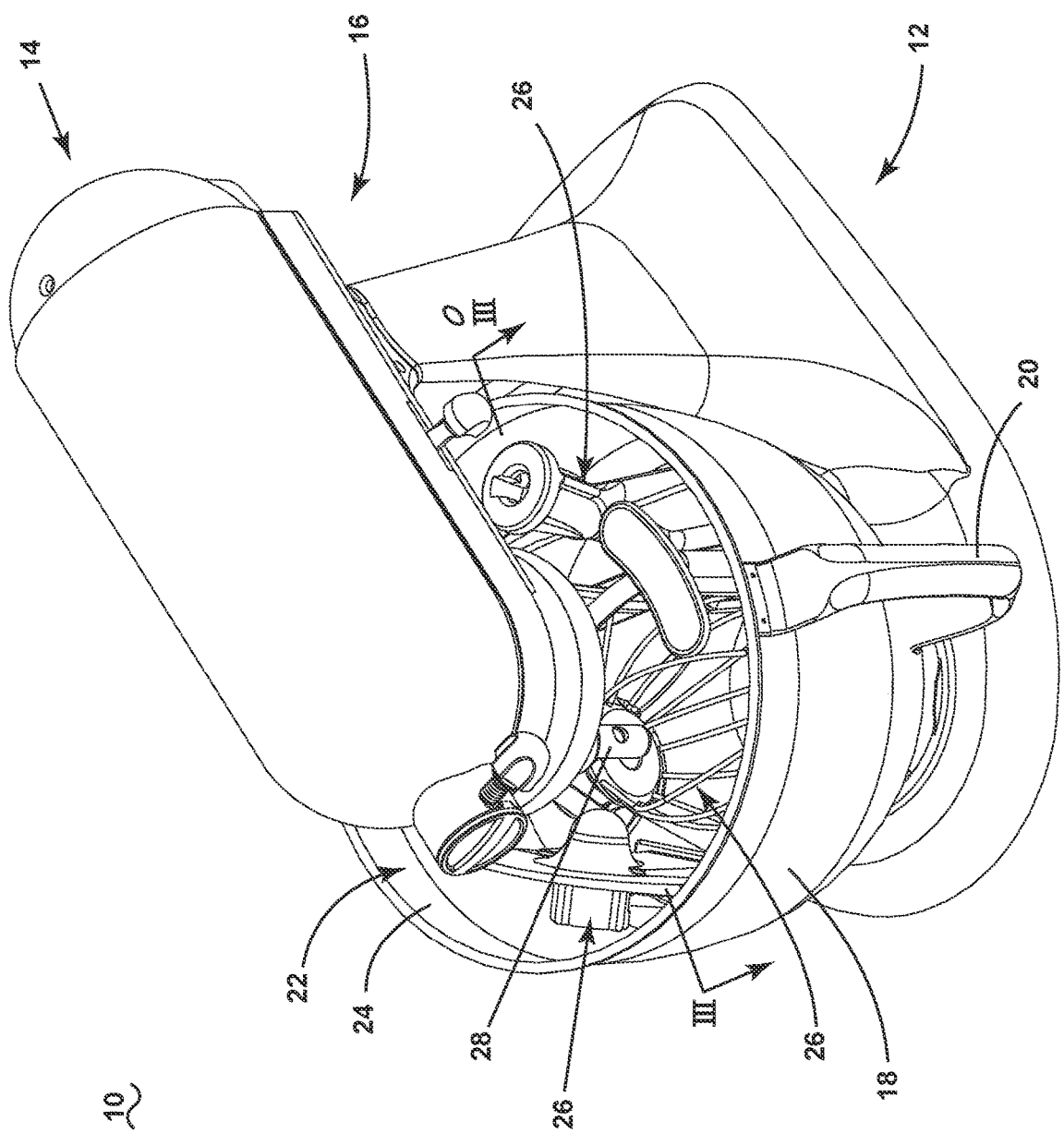
FIG. 1 illustrates an isometric view of a stand mixer having a mixing bowl and accessory caddy according to an aspect of the present disclosure.

Aspects of the disclosure relate to a caddy, a holder, or another storage apparatus or system for arranging, holding, storing, or keeping a number of mixing accessories or attachments for a mixing apparatus, a mixing system, or mixture treating appliance, or the like. While non-limiting aspects of the disclosure can be described with reference to a food-associated mixing appliance, such as a stand mixer for mixing food-grade or food-caliber ingredients, non-limiting aspects of the disclosure can be applicable in any mixing appliance or mixing system, including but not limited to, commercial mixing appliances, industrial mixing appliances, non-food-based mixing appliances, or the like. As used herein, the mixing appliance is described as performing an action on a load or article, or performing a cycle of operation on a load or article, by way of operating one or more systems, features, motors, attachments, accessories, timed cycles, or the like. In this sense, the mixing appliance can interact with the load, including but limited to, foodstuff, ingredients, mixtures, compounds, liquids, solids, or another state of matter or item, upon which a cycle of operation will take place.

In some instances, mixing appliances having attachments or accessories (hereafter, "attachments") enabled for operating a cycle of operation on a load do not include a fixed or convenient storage solution for storing the attachments while the mixing appliance is not in use. Simply keeping them in an open cavity, such as a mixing bowl can result in difficulty keeping all or a subset of the attachments organized and easily accessible. Additionally, in non-limiting examples, keeping all or a subset of attachments in an open cavity can result in the attachments freely moving about the cavity in response to movement or external forces acting on the attachments, which can result in damage to either the cavity surfaces, at least a subset of the attachments, or both. In the non-limiting example of a foodstuff stand mixer, the stand mixer can come with various accessories, such as a whisk attachment or accessory, a paddle-like attachment or accessory, such as a beater attachment or accessory, and a hook-like attachment or accessory, such as a dough hook attachment or accessory. Regardless of the specific attachments or accessories included, or provided after the point of sale, the attachments can be used or utilized for different mixing tasks of the mixing appliance. However, when the mixing appliance is not in use, these accessories can be cumbersome to store and can take up valuable space, including but not limited to counter spaces, cabinet space, or another storage space.

One potential solution is to store the accessories in a separate container, but this can be inconvenient if you need to switch between accessories during a recipe. Another option is to keep the accessories in their original packaging, but this can be wasteful and can also take up a lot of space.

Ideally, there would be a storage solution that allows the accessories to be neatly organized and easily accessible, without taking up too much space. Some stand mixer models do come with built-in storage solutions, such as a compartment on the mixer itself or a dedicated storage container that fits neatly under the mixer. However, not all stand mixers come with these features, leaving users to come up with their own storage solutions.

Non-limiting aspects of the disclosure can be included wherein a caddy for stand mixer accessories can be provided, allowing a user to store a set of stand mixer accessories with the caddy while the user is not using that set, or a subset, of the accessories. Additionally or alternatively, the caddy for the set or subset of stand mixer accessories can also be sized, shaped, or otherwise configured or adapted to fit with a bowl of the stand mixer, allowing a user to store the caddy (with the accessories) with the bowl and stand mixer, when the stand mixer is not being utilized to perform a cycle of operation.

As used herein, the term "set" or a "set" of elements can be any number of elements, including only one. As used herein, the terms "axial" or "axially" refer to a dimension along a major body axis or an axis extending through a circular, ovate, or conical component, as described. Additionally, as used herein, the terms "radial" or "radially" refer to a direction away from a common center or axis. The use of the terms "proximal" or "proximally," either by themselves or in conjunction with the terms "radial" or "radially," refers to moving in a direction toward the center axis, or a component being relatively closer to the center axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an connection between respective elements. The exemplary drawings are for purposes of illustration only and the dimensions, positions, order and relative sizes reflected in the drawings attached hereto can vary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other. As used herein, "substantially", especially in reference to a relative or geometric relationship (e.g., "substantially parallel" or "substantially horizontal") can include any relative relationship within, and inclusive of, a five degree angular variance from the described relationship (e.g. parallel or horizontal). As used herein, "horizontal" and "vertical" are provided as descriptive reference to the perspective of the illustrations, and relative to Earth ground.

FIG. 1 is an isometric view of a mixing appliance, such as a stand mixer 10. Non-limiting examples of a stand mixer 10 can include a base 12, a mixing head 14, and a neck 16 connecting the mixing head 14 with the base 12. During operation of the stand mixer 10, a power source (not shown) can provide electrical power for selectively energizing a mixing apparatus, such as a motor, to perform a cycle of operation on a load, such as a foodstuff load or ingredients. In one non-limiting example this motor (not shown) can be housed in, located within, or otherwise mechanically connected with the head 14 of the stand mixer 10, and have a stand mixer motor head, such as a kinetic or mechanical output 28, adapted or configured for transferring or otherwise conveying movements generated by the mixing appliance motor to a load during a cycle of operation.

FIG. 1 also illustrates a bowl 18, such as a mixing bowl, received at the stand mixer 10, for example, below the mechanical output 28. The bowl 18 can be received at or received by the base 12 of the stand mixer 10 in a removable coupling, such as a fixed attachment configuration or locking configuration, to ensure no movement of the bowl 18 relative to the base 12 during the cycle of operation. As illustrated, the bowl 18 can include an optional handle 20 for user interaction with the bowl 18, and the bowl 18 can define an interior 22 bound by an inner surface 24.

In the illustrated example, the interior 22 of the bowl 18 is shown housing, storing, or otherwise holding, a set of attachments or accessories 26 for the stand mixer 10. As used herein, the "accessories" 26 can include, but are not limited to, a set of stand mixer 10 attachments that can be attached, coupled, or otherwise utilized by the stand mixer 10, or motor thereof, to perform a cycle of operation on a load, such as a foodstuff load. In another non-limiting example, the accessories 26 can include, but are not limited to, a set of attachments that can be removably coupled with the mechanical output 28 described, such that the operation of the stand mixer 10 can provide a mechanical movement of the accessory 26 in order to perform, enable, or otherwise accomplish the cycle of operation on the load.

It will be understood that aspects of the disclosure illustrate the stand mixer 10, the bowl 18, and the set of accessories 26 in "stored" configuration. As used herein, a "stored" configuration includes an arrangement of components where the stand mixer 10 is not currently performing a cycle of operation on a load. In one non-limiting example, the illustrated stored configuration can be utilized for storage of the stand mixer 10 and related components, including the set of accessories 26, such as after performing cycles of operation, or prior to performing cycles of operation. Stated another way, the stored or storage configuration can be utilized when the stand mixer 10 and related components are not being currently used, and can be comparatively contained in a small footprint for storage away from a working area, to utilize less space when not being utilized.

It will further be understood that the stand mixer 10 can include an "operational" configuration, wherein the stand mixer 10 can be ready for performing a cycle of operation on a load. In this operational configuration, the bowl 18 of the stand mixer 10 can be emptied of the set of accessories 26, and the interior of the bowl 18 can be at least partially filled to include a load, such as a foodstuff load or ingredients. In this sense, the stand mixer 10 can include the bowl 18 attached at the base 12, and the motor (not shown) can be selectively energized to operate the mechanical output 28. The mechanical output 28 can transfer movement or motion to an attachment, such as one of the set of accessories 26, which can, for example, extend downwardly (relative to the frame of reference of FIG. 1) into the interior 22 of the bowl, to mix, agitate, tumble, or otherwise interact with the load during the cycle of operation.

Figure 2:
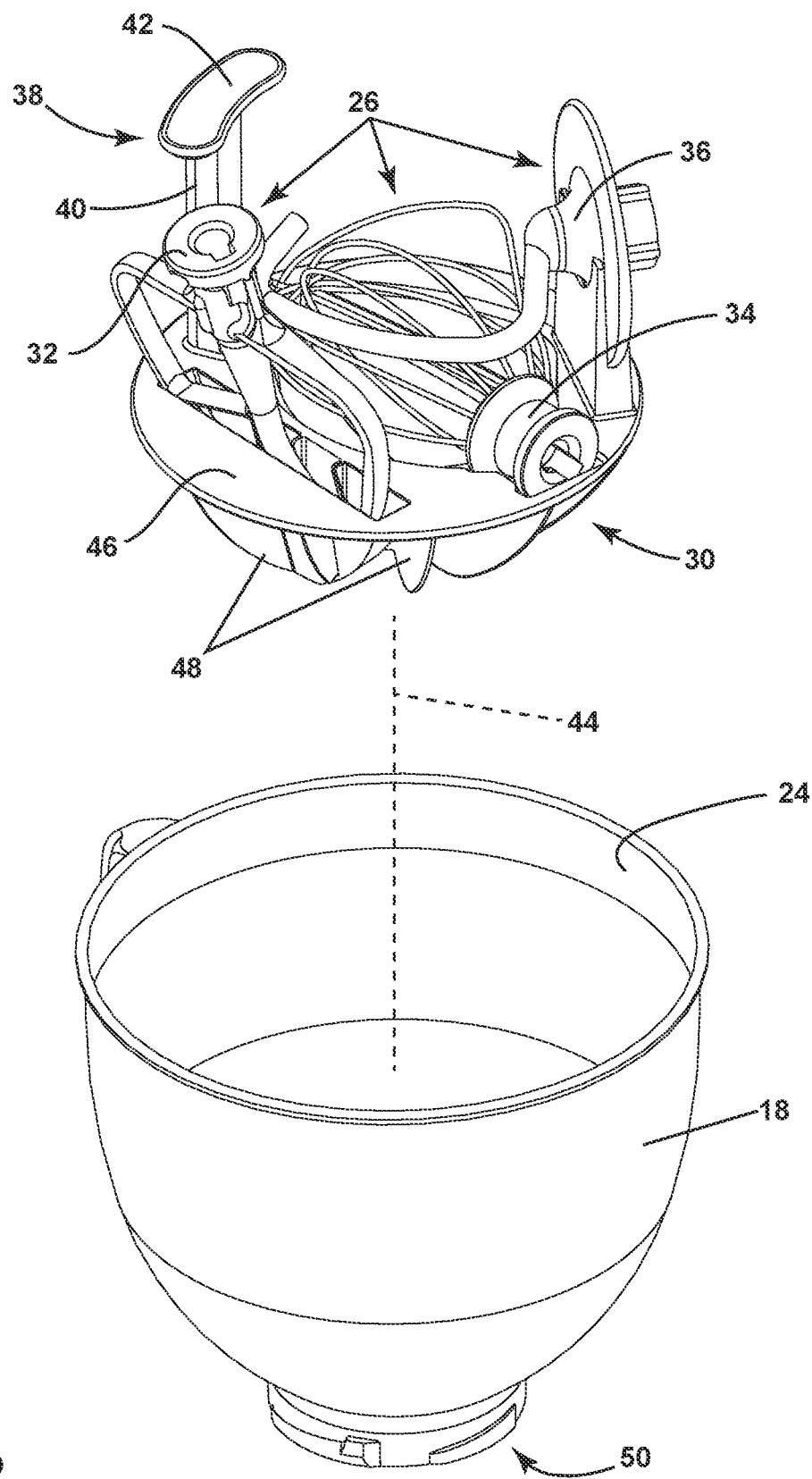
FIG. 2 illustrates an exploded isometric view of the accessory caddy and the mixing bowl of FIG. 1 according to an aspect of the present disclosure.

FIG. 2 illustrates an exploded isometric view of the mixing bowl 18, removed from the stand mixer 10 (not shown), and with a caddy 30 stored within the bowl 18 exploded away from the inner surface 24 of the bowl along an axis 44, such as a vertical axis, of the bowl 18. As shown, the axis 44 of the bowl 18 can be defined by a straight line passing through the center of the circular opening of the bowl 18. While a semi-spherical bowl 18 is illustrated, non-limiting aspects of the disclosure can be included wherein the bowl 18 can take on additional or alternative shapes or shape-like bowl configurations other than a semi-spherical bowl 18. For instance, non-limiting aspects of the disclosure can include a more conical-shaped bowl, a more elliptical-conical bowl, or generally any form of a structure with a concave-like inner surface 24 can be included in aspects of the disclosure, whereby an axis 44 can be defined.

As shown, aspects of the caddy 30 (which, while included in FIG. 1, were not clearly viewable in FIG. 1), can include, but are not limited to, a base surface 46, a set of legs, such as a set of feet 48 extending downwardly (relative to the frame of reference of FIG. 2) from the base surface 46, and a handle attachment 38. The handle attachment 38 is further shown including a vertically-extending (relative to the axis 44) arm 40 and a handle 42 configured or adapted by grasping by a user. It will be understood that while the set of feet 48 can be adapted to extend downwardly, the handle attachment 38 can extend oppositely or upwardly away from the base surface 46. In one non-limiting example configuration, the handle attachment 38 can be configured or adapted to extend upwardly toward the opening of the bowl 18 when the caddy 30 is received within the interior 22 of the bowl 18, and can be utilized by a user to grasp and lift the caddy 30 out of the interior 22 of the bowl 18 in the axial direction 44 to remove the caddy 30 from the interior 22 of the bowl 18. In this sense, the handle 42 can be located proximate to the upper ends of the bowl 18 sidewalls, such that a user does not have to depress their hands deep into the interior 22 of the bowl 18 to remove the caddy 30 from the interior 22 of the bowl 18.

As shown, the base surface 46 of the caddy can include a configuration for housing or receiving a set of accessories 26, shown as a beater 32, a whisk 34, and a dough hook 36. While a beater 32, a whisk 34, and a dough hook 36 are illustrated, additional or alternative accessories 26 can be included in aspects of the disclosure. As shown, non-limiting aspects of the disclosure can be included wherein the caddy 30 can be configured or adapted to receive, hold, store, or otherwise retain at least a subset of the beater 32, the whisk 34, the dough hook 36, or the like, at, on, or within a set or subset of depressions at the base surface 46 of the caddy 30. In this sense, the depressions can hold these accessories 26 during storage, or during moments where at least a subset of those accessories 26 are not in use during a cycle of operation of the stand mixer 10.

FIG. 2 additionally illustrates a non-limiting example aspect of a bowl base 50 for coupling or attaching the bowl 18 with the stand mixer base 12 (not shown).

Figure 3:
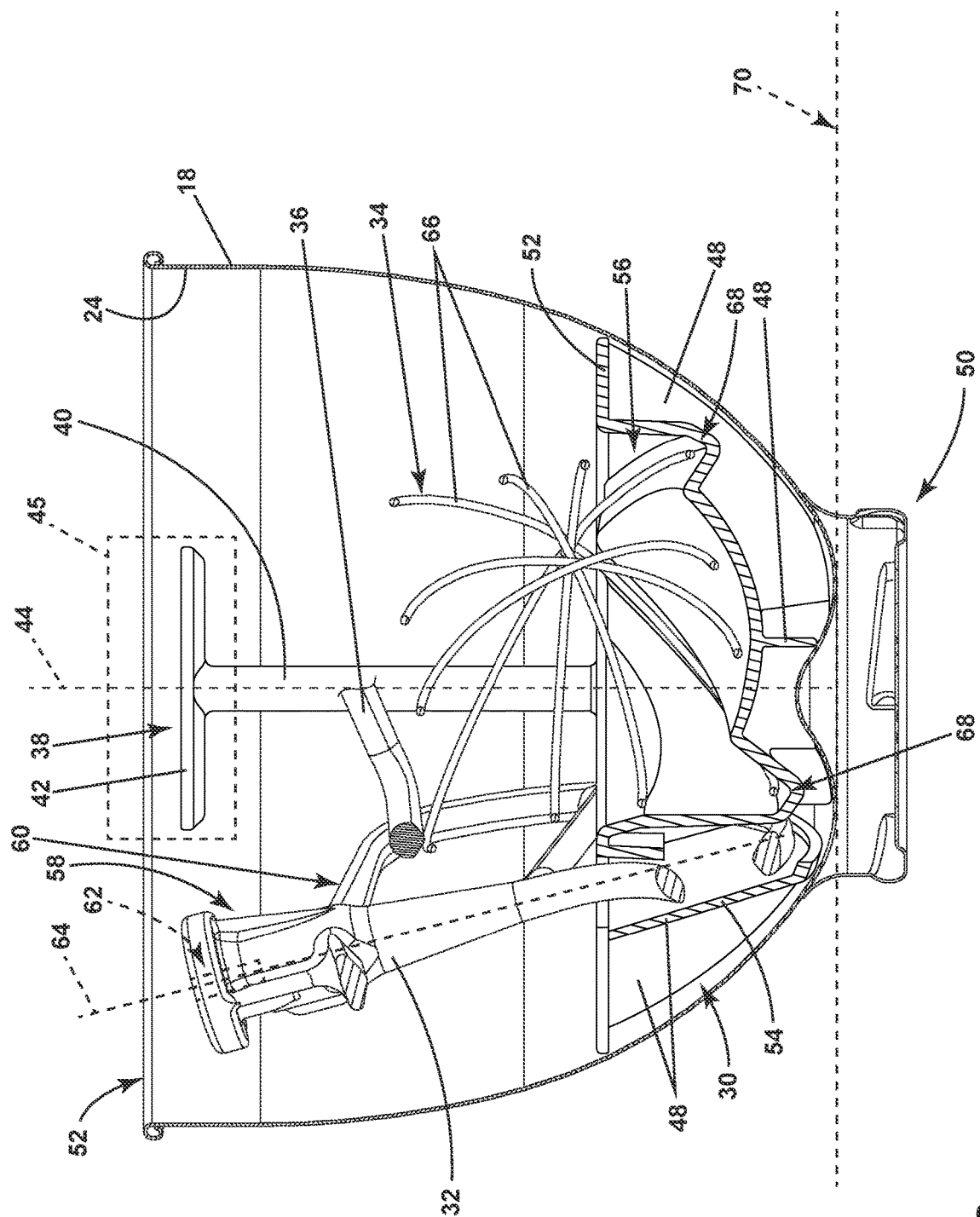
FIG. 3 illustrates a schematic cross-sectional view of the mixing bowl and accessory caddy taken along line III-III of FIG. 1.

FIG. 3 illustrates a schematic cross-sectional view of the mixing bowl 18 and accessory caddy 30 taken along line III-III of FIG. 1. As shown, the bowl 18 defines an opening at an upper lip 52 of the bowl 18 sidewalls. The caddy 30 can be received through the opening at the upper lip 52, wherein the caddy 30 is received in a vertical direction generally along the axis 44. Non-limiting aspects of the disclosure can be included wherein, for example, at least one of the handle 42 or the handle attachment 38 is received below the upper lip 52 of the bowl 18 when the caddy 30 is fully received by the bowl 18. As also illustrated, the set of feet 48 of the caddy 30 can be configured, adapted, conformed, or otherwise designed such that the set of feet 48 correspond with a lower surface or sidewalls of the bowl 18. In one non-limiting example, at least a subset of the feet 48 can be keyed or conformed to limited contours, surfaces, convex, or concave portions of the lower surface or sidewalls of the bowl 18, such that the caddy 30 does not sit level, or cannot otherwise be fully received by the bowl 18, unless a correct orientation, interface, positioning, or insertion of the caddy 30 (relative to the bowl 18) is accomplished. In this sense, an incorrect receiving of the caddy 30 relative to the bowl 18 can be visibly apparent to a user, such as the caddy 30 being received at an angled positions, the handle 42 or the handle attachment 38 not be received below the upper lip 52, or the like. The set of feet 48 can further be configured such that the caddy 30 can sit or rest of a level horizontal plane 70 when removed from the bowl 18, such as a counter top surface (not show).

The caddy 30 can include a set of depressions in the base surface 46 that can correspond with at least a set of the accessories 26, 32, 34. For instance, in the non-limiting illustration of the cross-section of FIG. 3, the caddy 30 can include a first depression 54 configured, adapted, sized, or otherwise designed to receive a lower end of the beater 32, such as the beater arms 60. In this sense, the beater 32 can be inserted along a pathway defined by an axis 64 of the beater 32 and extending through a beater head 58 and extending through a lowest portion of the beater arms 60. This axis 64 can further extend through the first depression 54 to receive the lowest portions of the beater arms 60 when the beater 32 is received by the first depression 54. In another non-limiting aspect of the disclosure, the beater head 58 can further define a coupling (illustrated in dotted outline 62) configured or adapted for mechanically coupling the beater 32 or the beater head 58 with the mechanical output 28 (not shown). In this example, the axis 64 of the beater 32 can further be defined by way of extending through, concentric with, coaxial with, or a combination thereof, the coupling 62. As shown, the axis 64 of the beater 32, when received by the first depression 54, can be offset relative to the axis 44 of the bowl 18. In one non-limiting example, the axis 64 can be 15 degrees offset relative of vertical, such as the vertical axis 44. In this sense, the offset angle between the axis 64 and the axis 44 can be greater than zero degrees, such that the beater head 58 tilts away from the axis 44, compared with the beater arms 60. Stated another way, when the beater 32 is received by the first depression 54, the beater head 58 is at a greater radial distance from the axis 44 of the bowl 18, compared with the lowest or most distal end of the beater arms 60.

In another non-limiting example, the caddy 30 can include a second depression 56 configured, adapted, sized, or otherwise designed to receive at least a portion of the whisk 34. For instance, while only partially viewable due to the cross-sectional view of FIG. 3, the whisk 34 can include a set of whisk tines 66 that can be at least partially received within the second depression 56 when the whisk 34 is received by the caddy 30. The second depression 56 can further include sub-depressions 68, that is, a depression within the second depression 56, configured, adapted, sized, or otherwise designed to receive an individual whisk tine 66, for example. In this sense, a set of sub-depressions 68 within the second depression 56 can be positioned, arranged, or otherwise located relative to the second depression 56 such that a specific subset of the whisk tines 66 can be received at the sub-depressions 68 in order to conform the receiving of the whisk 34 within the second depression 56 in a particular orientation or keyed relationship.

It is further noted that the arrangement or the receiving of the set or a subset of the accessories 26, including but not limited to the beater 32, the whisk 34, and the dough hook 36 (only shown in FIG. 3 in abbreviated form to prevent misunderstanding of arrangement), within or at the caddy 30 can be arranged, adapted, or otherwise configured to allow for a clearance of the mechanical output 28 of the stand mixer 10 (neither shown) when the bowl 18 and caddy 30 are received at the base 12 of the stand mixer 10 (neither shown). This clearance is schematically illustrated in dotted outline 45, and demonstrates a space that may be otherwise occupied by the mechanical output 28 (such as a shaft) when the bowl 18 and caddy 30 are received at the stand mixer 10. In this sense, and in this understanding, the caddy 30, at least one depression 54, 56, 68 thereof, or any other configuration, arrangement, or the like for containing the set or a subset of the accessories 26, 32, 34, 36, can be designed or adapted to ensure that none of the accessories 26, 32, 34, 36 or portions thereof, impede, intersect, or otherwise intrude upon the clearance 45. The prevention of intrusion upon the clearance 45, by the design or configuration of the caddy 30, ensures that the set or a subset of the accessories 26, 32, 34, 36 can be received at the caddy 30, and that the caddy 30 can further be received in the bowl 18, and that further the bowl 18 can be received by the stand mixer 10 in the aforementioned storage configuration.

Figure 4:
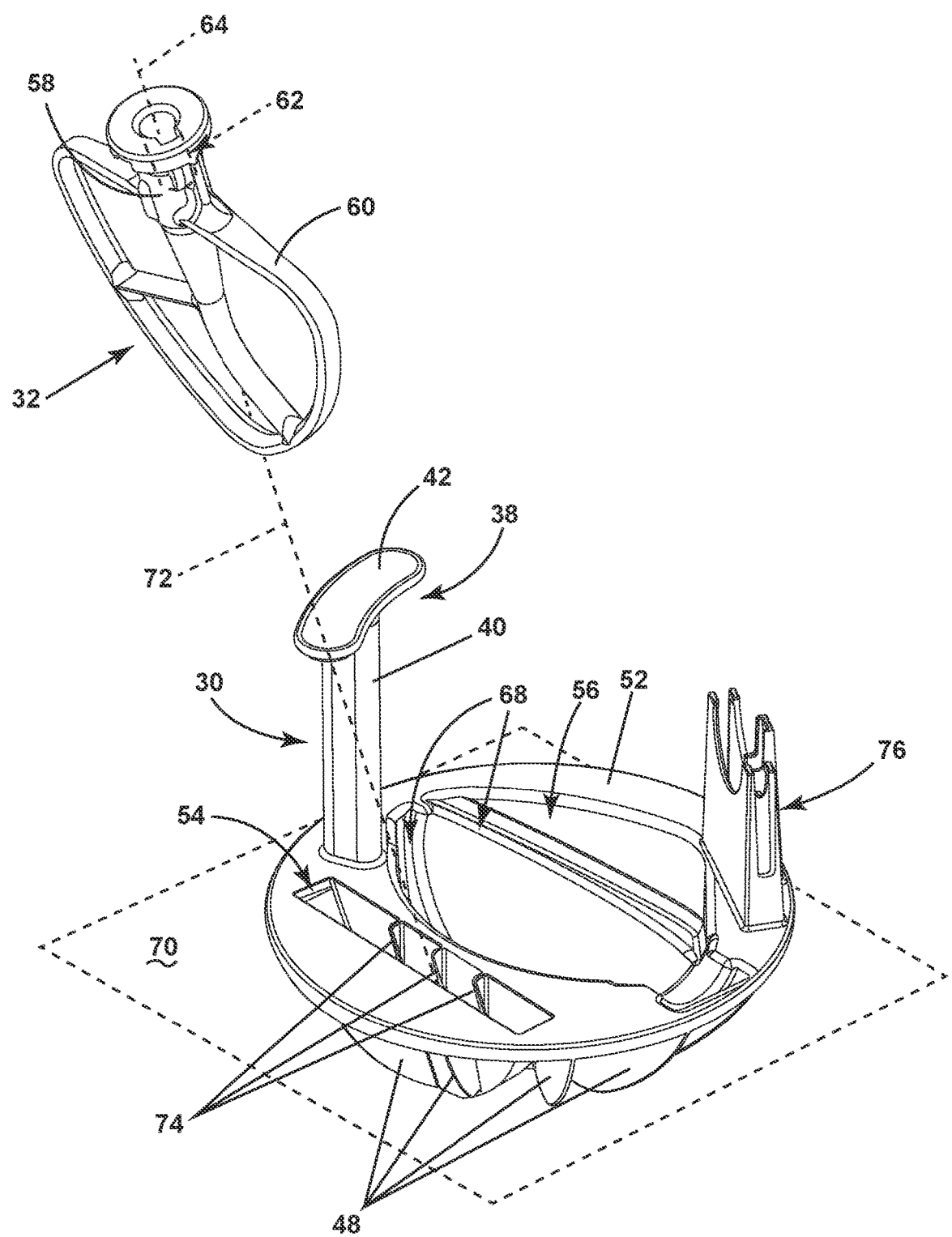
FIG. 4 illustrates an exploded isometric view of the accessory caddy and a beater attachment of the stand mixer, according to an aspect of the present disclosure.

FIG. 4 illustrates an exploded isometric view of the accessory caddy 30 and the beater attachment 32 of the stand mixer 10, with a focus on the receiving of the beater 32 at the caddy 30, according to an aspect of the present disclosure. In this figure, additional accessories and components are removed for brevity and understanding of the interaction between the caddy 30 and the beater 32.

As shown, the beater 32, having an axis 64, can be at least partially inserted within the first depression 54 for storage of the beater 32 within or at the caddy 30, along a pathway 72 or axis of the first depression 54. In one non-limiting example, only a portion of the beater arms 60 can be received within the first depression 54. As shown, and in another non-limiting example aspect of the disclosure, a sidewall of the first depression 54 can include at least one extension 74 of fingers or ribs extending from the sidewall into the first depression 54. The extensions 74 can be operably configured or arranged to provide an interface of the first depression 54 that at least partially contacts or interacts with the portion of the beater 32 received within or by the first depression 54. In this sense, the interaction or interface between the portion of the beater 32 receiving within or by the first depression 54 can form a frictional or press-fit interface that can operably retain the beater 32 relative to the caddy 30 or first depression 54 when the beater 32 is fully received or inserted by the first depression. It will be understood that "fully received" or "fully inserted" denotes a position where a first component is designed to be, or cannot be received or inserted further, relative to a second component. Stated another way, the beater 32 can be fully received or fully inserted even when only a portion of the arms 60 are received in the first depression 54, such as when the arms 60 contact a lower surface of the first depression 54, or when the frictional or press-fit interface reasonably prevents further insertion. The extensions 74 can further operably guide the portion of the beater 32 received within or by the first depression 54 along the pathway 72 to a fully received position between the beater 32 and the first depression 54.

Also illustrated in FIG. 4, the caddy 30 is shown, as one example, resting or sitting on a planar horizontal surface 70, demonstrating that the set of feet 48 can further be configured such that the caddy 30 can sit or rest of a level horizontal plane when removed from the bowl 18 (not included in FIG. 4). Additionally, FIG. 4 illustrates one non-limiting example of an arm 76 extending vertically away from the caddy 30 or the base surface 46, and extending away in the same direction as the handle attachment 38. In one non-limiting example, the arm 76 can be configured or adapted to retain, hold, or otherwise receive the dough hook 36 (not shown), and will be further explained with respect to FIG. 6.

Figure 5:
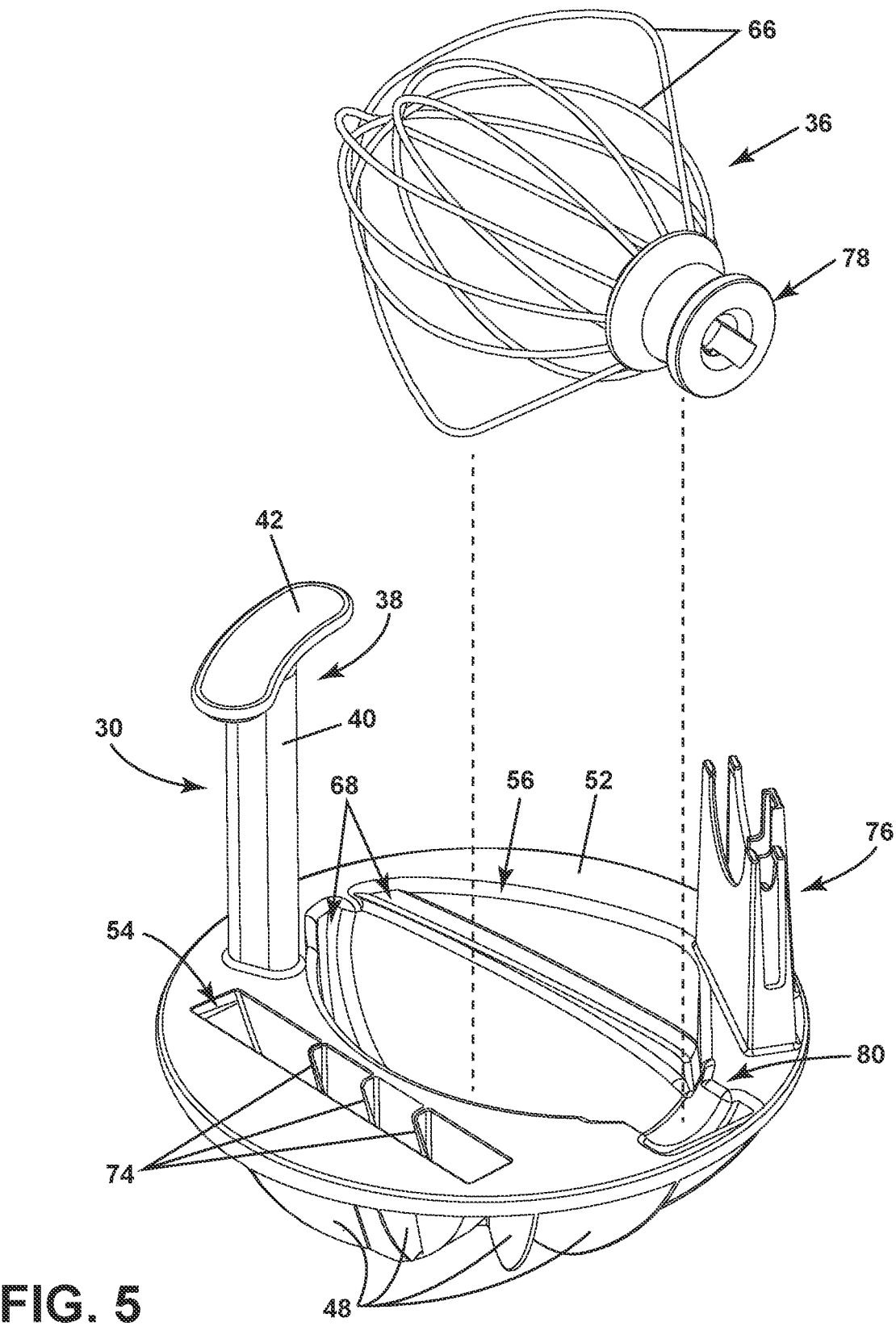
FIG. 5 illustrates an exploded isometric view of the accessory caddy and a whisk attachment of the stand mixer, according to an aspect of the present disclosure.

FIG. 5 illustrates an exploded isometric view of the accessory caddy 30 and the whisk attachment 34 of the stand mixer 10, with a focus on the receiving of the whisk 34 at the caddy 30, according to an aspect of the present disclosure. As with FIG. 4, in FIG. 5, additional accessories and components are removed for brevity and understanding of the interaction between the caddy 30 and the whisk 34.

In addition to the tines 66, the whisk 34 can define a whisk head 78. In non-limiting examples, the whisk head 78 can further define a coupling, similar to a coupling 62 of the beater 32, configured or adapted for mechanically coupling the whisk 34 or the whisk head 78 with the mechanical output 28 (not shown). The coupling of the whisk head 78 can otherwise be similar to the coupling 62 of the beater 32, and like descriptions of the coupling 62 can apply to the coupling of the whisk head 78, but are not duplicated for brevity.

The second depression 56 can further include a head depression 80 portion that corresponds with and is shaped, arranged, configured, contoured, or the like, to receive the whisk head 78 when the whisk 34 is at least partially received at the second depression 56. As shown, the whisk 34 can be arranged horizontally (from whisk head 78, an axis of the coupling of the whisk head 78, to the extension of the tines 66 away from the whisk head 78) to be lowered within the second depression 56, and can be at least partially inserted within the second depression 56 for storage of the whisk 34 within or at the caddy 30. As explained, in one non-limiting aspect of the disclosure, a set of sub-depressions 68 can be arranged, configured, adapted, sized, or otherwise designed to receive an individual whisk tine 66 in order to conform the receiving of the whisk 34 within the second depression 56 in a particular orientation or keyed relationship.

In another non-limiting example aspect of the disclosure, the head depression 80 can be operably configured or arranged to provide an interface of the second depression 56 that at least partially contacts or interacts with the portion of the whisk 34 or whisk head 78 received within or by the second depression 56. In this sense, the interaction or interface between the portion of the whisk 34 or whisk head 78 receiving within or by the second depression 56 or the head depression 80 can form a frictional or press-fit interface that can operably retain the whisk 34 or whisk head 78 relative to the caddy 30, the second depression 56, or the head depression 80 when the whisk 34 is fully received by the first depression. In this sense, similar to the "fully received" or "fully inserted" description relative to the beater 32, the whisk 34 can be fully received or fully inserted even when only a portion of the tines 66, the whisk head 78, or a combination thereof, are received in the second depression 54, at least a subset of the sub-depressions 68, the head depression 80, or a combination thereof, such as when tines 66 or the whisk head 78 contact a lower surface of the second depression 56, or when the frictional or press-fit interface reasonably prevents further insertion.

Figure 6:
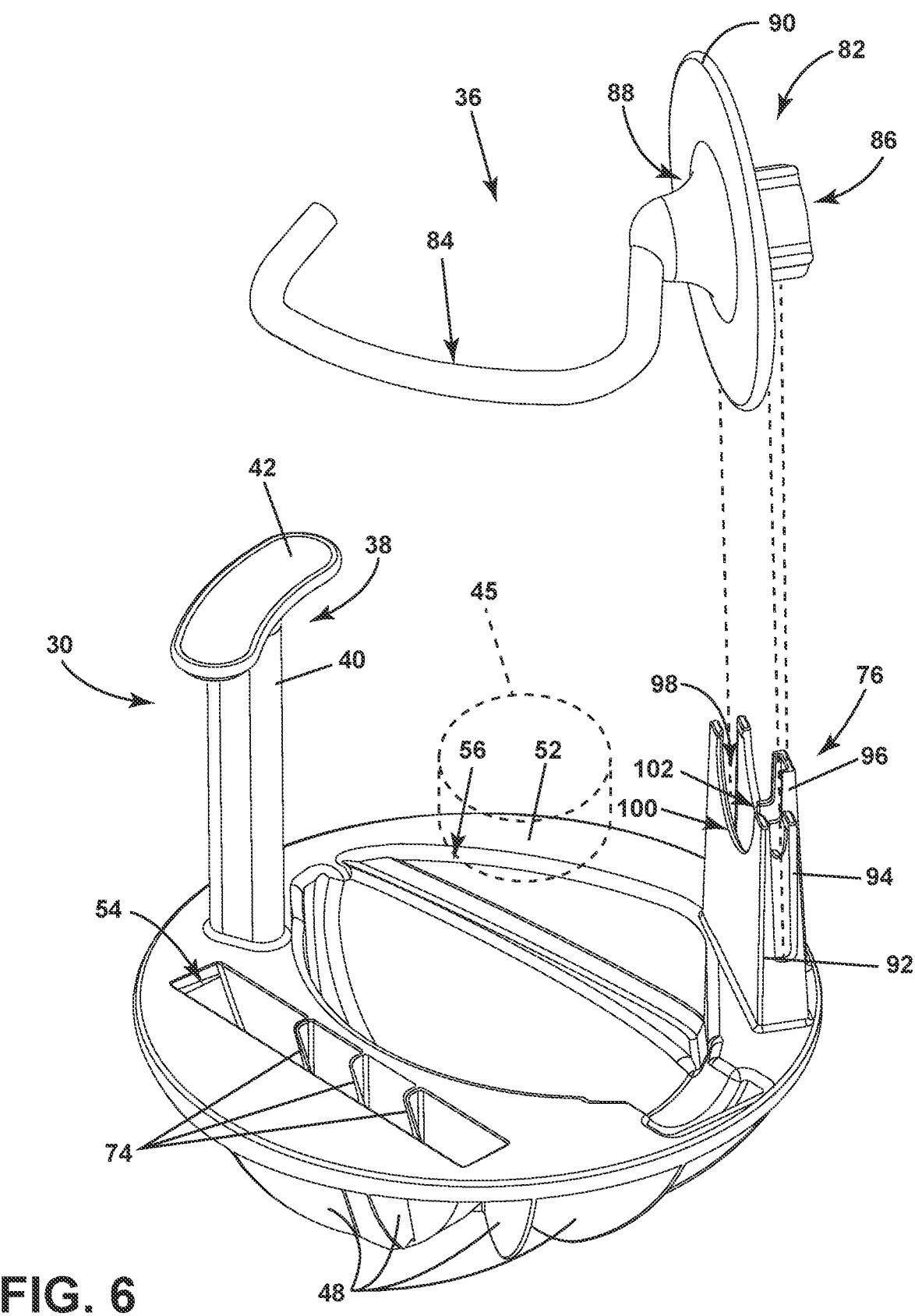
FIG. 6 illustrates an exploded isometric view of the accessory caddy and a hook attachment of the stand mixer, according to an aspect of the present disclosure.

FIG. 6 illustrates an exploded isometric view of the accessory caddy 30 and the dough hook attachment 36 of the stand mixer 10, with a focus on the receiving of the dough hook 36 at the caddy 30, according to an aspect of the present disclosure. As with FIGS. 4 and 5, in FIG. 6, additional accessories and components are removed for brevity and understanding of the interaction between the caddy 30 and the dough hook 36.

As best seen in FIG. 6, the dough hook 36 can include a hook head 82 portion having a coupling 86, similar to a coupling 62 of the beater 32 and whisk 34, configured or adapted for mechanically coupling the dough hook 36 or the hook head 82 with the mechanical output 28 (not shown). The coupling 86 of the hook head 78 can otherwise be similar to the coupling 62 of the beater 32, and like descriptions of the coupling 62 can apply to the coupling 86 of the hook head 82, but are not duplicated for brevity. The dough hook 36 can further include a disc-like portion 90, such as a flange, adjacent to the hook head 82, and a neck portion 88 that transitions from the disc-like portion 90 to a hook 84. In one non-limiting example, the neck portion 88 can have a generally bell-like shaping or contouring, although additional geometric configurations can be included. The hook 84 defines a partial ring-like extending arm away from the neck portion 88 and curving along a somewhat circular circumference. In another non-limiting example, the hook 84 curvature in the ring-like extending arm can further include a non-planar, or helical, curvature.

The arm 76 extending vertically away from the caddy 30 or the base surface 46, can be configured or adapted to retain, hold, or otherwise receive the dough hook 36. Specifically, the arm 76 can include a first wall 92 extending vertically away from the caddy 30 or base surface 46 and a second wall 94 extending vertically away from the caddy 30 or base surface 46. In one non-limiting example, the first wall 92 can be spaced from the second wall 94 to define a U-shaped gap 98 or U-shaped channel between the first wall 92 and the second wall 94. In another non-limiting example, the first wall 92 and the second wall 94 can be parallel with one another. The first wall 92, at an end distal from the caddy 30 or the base surface 46 can further include a cutout, such as a first semi-circular cutout 100. The second wall 94 at an end distal from the caddy 30 or the base surface 46 can further include another cutout, such as a second semi-circular cutout 100.

When the dough hook 36 is received at the arm 76, the arrangement of the dough hook 36 and arm 76 can be configured, adapted, or otherwise enabled such that the U-shaped gap 98 is sized or shaped to receive the disc-like portion 90 of the hook head 82 laterally between the first wall 92 and the second wall 94. In this sense, the U-shaped gap 98 can define or include a depression between the first wall 92 and the second wall 94 to receive a disc in a generally parallel relationship between the first wall 92 and the second wall 94. In this sense, while not seen in the perspective of FIG. 6, the lower surface of the U-shaped gap 98 can optionally further include a circumferential depression extending between lateral ends parallel with the first wall 92 or the second wall 94, such that the circumferential depression can be contoured to correspond with the radially outer circumferential wall of the disc-like portion 90.

In another non-limiting example, the first semi-circular cutout 100 can be shaped to correspond with a portion of the neck portion 88 when the dough hook 36 is full received at the arm 76. Similarly, in another non-limiting example, the second semi-circular cutout 102 can be shaped to correspond with a portion of the hook head 82, coupling 86, or otherwise rear portion of the dough hook 36 opposite the disc-like portion 90, away from the neck portion 88, when the dough hook 36 is full received at the arm 76. In this sense, the first cutout 100 and second cutout 102 can be sized, shaped, adapted, or otherwise enabled to receive the contoured portions of the hook head 82 adjacent the disc-like portion 90.

In another non-limiting example aspect of the disclosure, the arm 76 can be operably configured or arranged to provide an interface of the arm 76, the U-shaped gap 98, the first semi-circular cutout 100, the second semi-circular cutout 102, or a combination thereof, that at least partially contacts or interacts with the portion of the dough hook 36 or hook head 82 received within or by the arm 76. In this sense, the interaction or interface between the portion of the dough hook 36 or hook head 82 receiving within or by the arm 76, the U-shaped gap 98, the first semi-circular cutout 100, the second semi-circular cutout 102, or a combination thereof, can form a frictional or press-fit interface that can operably retain the dough hook 36 or hook head 82 relative to the caddy 30, the arm 76, or the like, when the dough hook 36 or hook head 82 is fully received by the arm 76. In this sense, similar to the "fully received" or "fully inserted" description relative to the beater 32 and the whisk 34, the dough hook 36 or hook head 82 can be fully received or fully inserted even when only a portion of the hook head 82, the disc-like portion 90, or the like, are received in the arm 76, the U-shaped gap 98, the first semi-circular cutout 100, the second semi-circular cutout 102, or a combination thereof, such as when disc-like portion 90 contacts a lower surface of the U-shaped gap 98, when the neck portion 88 contacts a lower surface of the first semi-circular cutout 100, when a portion of the hook head 82, coupling 86, or otherwise rear portion of the dough hook 36 contacts a lower surface of the second semi-circular cutout 102, a combination thereof, or when the frictional or press-fit interface reasonably prevents further insertion.

As further shown, the arm 76 can optionally include a third wall 96 extending vertically away from the caddy 30 or base surface 46, and positioned adjacent the second wall 94, opposite the first wall 92. The third wall 96 can be configured, adapted, or otherwise enabled to index the dough hook 36 relative to the caddy 30, for example, to prevent rotation of the hook 84 about an axis defined by the coupling 86. In another non-limiting example the third wall 96 can include a friction coupling with the dough hook 36 or a press-fit coupling with the dough hook 36.

When the dough hook 36 is fully received or fully inserted with the arm 76, as explained herein, the interfacing between the dough hook 36 and the arm 76 can prevent in inhibit movement or rotation of the dough hook 36 that would allow for the hook 84 to rotate about hook head 82. In this sense, while the hook 84 is suspended in a generally horizontal position above at least a portion of the caddy 30, for example, by way of a cantilever arrangement between the hook head 82 and the arm 76, the arrangement can ensure that the ring-like hook 84 encircles or otherwise does not impede, intersect, or otherwise intrude upon the clearance 45, as previously described.

Figure 7:
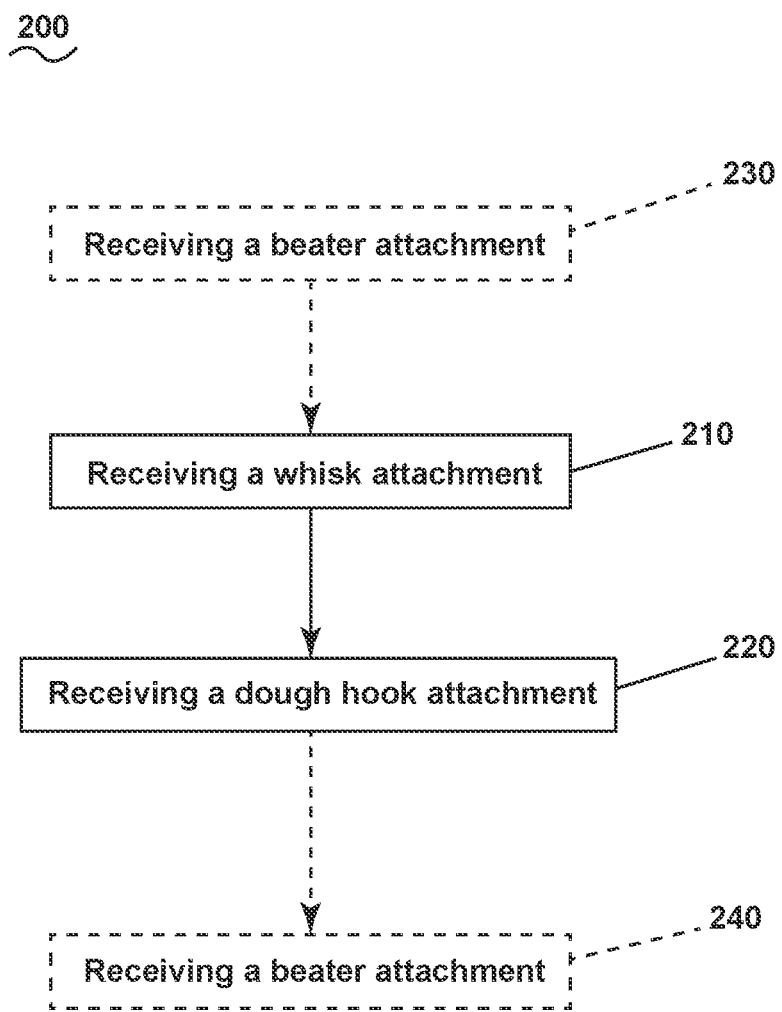
FIG. 7 illustrates an example flow chart diagram of demonstrating a method of assembling a set of stand mixer accessories with a caddy, according to an aspect of the present disclosure.

FIG. 7 illustrates an example flow chart diagram of demonstrating a method 200 of assembling a set of stand mixer accessories with the caddy 30, according to an aspect of the present disclosure. As understood in the present disclosure, the dough hook 36 generally overlies the whisk 34 when the caddy 30 receives the set of accessories. Thus, when assembling the set or a subset of the accessories at the caddy 30, the method 200 includes receiving the whisk 34 attachment, at 210, within the second depression 56, followed by receiving the dough hook 36 attachment, at 220, at the arm 76. As the receiving of the beater 32 at the caddy 30 is not physically impeded by the arrangement of either the whisk 34 or the dough hook 36, the receiving of the beater 32 attachment at or in the first depression 54 can occur either prior to receiving the whisk 34 at 210, shown as optional step 230, or after receiving the dough hook 36 at 220, shown as optional step 240. Additionally, while not illustrated, non-limiting example aspects of the method 200 can be included wherein, for example, the receiving of the beater 32 attachment can optionally occur between the receiving of the whisk 34 at 210 and the receiving of the dough hook 36 at 220.

In one non-limiting example, the whisk 34 can be received by the caddy 30 or the second depression 56 in a substantially horizontal position, at 210. In another non-limiting example, the receiving of the dough hook 36 attachment can further include receiving the dough hook 36 in a substantially horizontal position. In another non-limiting example, the method 200 can include receiving the caddy 30 base coaxially in the stand mixer bowl 18. In yet another non-limiting example, the method 200 can include receiving the dough hook 36 attachment in a substantially horizontal position such that the hook of the dough hook attachment allows for a coaxial clearance 45 of a stand mixer motor head or mechanical output 28, such as a spindle. In yet another non-limiting example, the method 200 can include receiving the caddy 30 base coaxially in the stand mixer bowl 18 by way of lowing the caddy 30 base by way of the handle 42 or the handle attachment 38 extending vertically from the caddy 30 base.

In yet another non-limiting example, the method 200 can include receiving the caddy 30 base coaxially in the stand mixer bowl 18 such that all of the caddy 30 base, the beater 32 attachment, the whisk 34 attachment, and the dough hook 36 attachment are received below a lip 52 of the stand mixer bowl 18. In this example, the receiving can further be included wherein the handle 42 or the handle attachment 38 is received below the upper lip 52 of the stand mixer bowl 18. In yet another non-limiting example, the method 200 can include receiving the stand mixer bowl 18 in the stand mixer 10 for storage.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method. Many other possible aspects and configurations in addition to that shown in the above figures are contemplated by the present disclosure.

To the extent not already described, the different features and structures of the various aspects can be used in combination with each other as desired, or can be used separately. That one feature can not be illustrated in all of the aspects is not meant to be construed that it cannot be, but is done for brevity of description. Thus, the various features of the different aspects can be mixed and matched as desired to form new aspects, whether or not the new aspects are expressly described.

While the present disclosure has been specifically described in connection with certain specific aspects thereof, it is to be understood that this is by way of illustration and not of limitation. Reasonable variation and modification are possible within the scope of the forgoing disclosure and drawings without departing from the spirit of the present disclosure. Hence, specific dimensions and other physical characteristics relating to the aspects disclosed herein are not to be considered as limiting, unless expressly stated otherwise.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A caddy for a stand mixer bowl, comprising:
a base shaped to be coaxially received at a concave surface of the stand mixer bowl, and defining a vertical axis, the base further comprising:
a first depression defining an axis offset relative to the vertical axis and adapted to receive a beater stand mixer attachment;
a second depression adapted to receive a whisk stand mixer attachment; and
an arm extending vertically away from the base and adapted to receive a dough hook stand mixer attachment; the arm including a first wall extending vertically away from the base and a second wall extending parallel with the first wall, and wherein the first wall and the second wall are spaced from each other such that the arm defines a U-shaped channel; and
a handle extending from the base.

2. The caddy of claim 1, wherein the base includes a set of legs shaped such that the base defines a horizontal surface when received at the concave surface of the stand mixer bowl or when placed on another horizontal planar surface.

3. The caddy of claim 1, wherein, when the base is assembled with the beater, the whisk, and the dough hook, and when the base is received within the stand mixer bowl, all of the caddy, the beater, the whisk, and the dough hook are received below a lip of the stand mixer bowl.

4. The caddy of claim 3, wherein the handle is received below a lip of the stand mixer bowl.

5. The caddy of claim 1, wherein when the base is assembled with the beater, the whisk, and the dough hook, when the base is received within the stand mixer bowl, and when the stand mixer bowl is received by a stand mixer, all of the caddy, the beater, the whisk, and the dough hook are positioned to allow for a coaxial clearance of a stand mixer motor head.

6. The caddy of claim 5, wherein the dough hook defines a hook extending away from a hook base, and wherein the hook at least partially encircles the coaxial clearance.

7. The caddy of claim 1, wherein the second depression is adapted to receive the whisk in a substantially horizontal arrangement.

8. The caddy of claim 1, wherein the base includes at least one rib at the first depression adapted to receive the beater in a press-fit relationship between the depression and the at least one rib.

9. The caddy of claim 1, wherein the U-shaped channel is adapted to receive a flange of the dough hook between the first wall and the second wall.

10. The caddy of claim 9, wherein the dough hook is received at the arm in a substantially horizontal arrangement.

11. The caddy of claim 1, wherein the second depression receives the whisk prior to the arm receiving the dough hook.

12. A method of assembling a set of stand mixer accessories with a caddy, the method comprising:

receiving a beater attachment in a first depression of a caddy base;

receiving a whisk attachment in a substantially horizontal position, in a second depression of the caddy base; and after receiving the whisk attachment, receiving a dough hook attachment in a substantially horizontal position, in an arm extending vertically away from the caddy base, wherein the arm includes a first wall extending vertically away from the base and a second wall extending parallel with the first wall, and wherein the first wall and the second wall are spaced from each other such that the arm defines a U-shaped channel, such that the U-shaped channel receives a flange of the dough hook attachment.

13. The method of claim 12, further comprising receiving the caddy base coaxially in a stand mixer bowl.

14. The method of claim 13, wherein the receiving a dough hook attachment in a substantially horizontal position such that a hook of the dough hook attachment allows for a coaxial clearance of a stand mixer motor head.

15. The method of claim 13, wherein the receiving the caddy base coaxially in the stand mixer bowl further includes lowering the caddy base by way of a handle extending vertically from the caddy base.

16. The method of claim 15, wherein the receiving the caddy base coaxially in the stand mixer bowl includes receiving the caddy base in the stand mixer bowl such that all of the caddy base, the beater attachment, the whisk attachment, and the dough hook attachment are received below a lip of the stand mixer bowl.

17. The method of claim 16, wherein the handle is received below a lip of the stand mixer bowl.

18. The method of claim 13, further comprising receiving the stand mixer bowl in a stand mixer for storage.

19. The method of claim 12, wherein the receiving the beater attachment occurs prior to receiving the whisk attachment.

20. A caddy for a stand mixer bowl having a concave shaped bottom wall, comprising:

a base having a circular upper lip and a plurality of concaved legs extending from the upper lip and shaped for being coaxially received by the concave surface of the stand mixer bowl, and defining a vertical axis, the base further comprising:

a first depression defining an axis offset relative to the vertical axis and adapted to receive a beater stand mixer attachment;

a second depression adapted to receive a whisk stand mixer attachment; and an arm extending vertically away from the base and adapted to receive a dough hook stand mixer attachment; and a handle extending from the base.

* * * * *